(12) United States Patent
John et al.

(10) Patent No.: US 12,743,114 B2
(45) Date of Patent: Sep. 22, 2026

(54) SMART PRESSURE REGULATOR FOR AIRCRAFT OXYGEN SYSTEM

(71) Applicant: B/E AEROSPACE, INC., Winston Salem, NC (US)

(72) Inventors: Poly John, Cochin (IN); Ashish Kumar Agarwal, Bangalore (IN); Sugumaran Selvaraj, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 721 days.

(21) Appl. No.: 18/299,847

(22) Filed: Apr. 13, 2023

(65) Prior Publication Data

US 2024/0281009 A1 Aug. 22, 2024

(30) Foreign Application Priority Data

Feb. 17, 2023 (IN) ............................ 202341010901

(51) Int. Cl.
*G05D 16/20* (2006.01)
*A62B 7/14* (2006.01)
*B64D 10/00* (2006.01)

(52) U.S. Cl.
CPC ............ *G05D 16/202* (2013.01); *A62B 7/14* (2013.01); *B64D 10/00* (2013.01); *B64D 2231/02* (2013.01)

(58) Field of Classification Search
CPC .............................. A62B 7/14; B64D 2231/02
See application file for complete search history.

(56) References Cited

U.S. PATENT DOCUMENTS 3,752,175 A * 8/1973 Hamilton ............... A62B 9/027 137/506
4,976,460 A * 12/1990 Newcombe ........ G05D 23/1393 236/12.12

(Continued)

FOREIGN PATENT DOCUMENTS

EP 2286877 1/2019
EP 4190696 6/2023
WO 2004087568 10/2004

OTHER PUBLICATIONS

European Patent Office, European Office Action dated Nov. 19, 2025 in Application No. 23220725.8.

(Continued)

*Primary Examiner* — Kathryn E Ditmer
(74) *Attorney, Agent, or Firm* — SNELL & WILMER L.L.P.

(57) ABSTRACT

A pressure regulator system is disclosed. The system includes: a valve module; a controller; and a plurality of sensors. The controller is operably coupled to the valve module to adjust outflow of gas from an outlet of the valve module to a plurality of masks in an interior of an aircraft. The plurality of sensors comprises at least one of a pressure sensor and a temperature sensor and the controller is configured to receive feedback of sensed data at the outlet of the valve module about at least outlet pressure and ambient temperature from at least the pressure sensor and the temperature sensor and adjust the outflow of gas from the outlet of the valve module by determining an open-valve time based on the feedback of sensed data received from each sensor.

20 Claims, 8 Drawing Sheets

(56) References Cited

U.S. PATENT DOCUMENTS

| | | | | |
|---|---|---|---|---|
| 6,035,878 | A * | 3/2000 | Adams | G05D 16/2095 137/12 |
| 6,418,956 | B1 * | 7/2002 | Bloom | G05D 16/185 137/488 |
| 6,539,315 | B1 * | 3/2003 | Adams | G01F 1/383 73/861.58 |
| 6,758,233 | B2 * | 7/2004 | Sulatisky | G05D 16/2024 251/30.01 |
| 9,119,977 | B2 * | 9/2015 | Rittner | A62B 7/14 |
| 10,106,263 | B2 | 10/2018 | Horner | |
| 2004/0216742 | A1 * | 11/2004 | Talty | A62B 7/14 128/204.26 |
| 2007/0017573 | A1 * | 1/2007 | Frampton | F16K 37/0091 137/81.1 |
| 2008/0035150 | A1 * | 2/2008 | Rittner | A62B 9/022 128/205.25 |
| 2009/0189103 | A1 * | 7/2009 | Siska, Jr. | G05D 16/107 251/129.08 |
| 2011/0041853 | A1 * | 2/2011 | Rittner | A62B 7/14 128/205.24 |
| 2011/0174307 | A1 * | 7/2011 | Lessi | H04L 45/50 128/205.24 |
| 2013/0306073 | A1 * | 11/2013 | Fromage | A62B 9/022 128/204.22 |
| 2020/0298978 | A1 * | 9/2020 | Homer | B64D 13/04 |
| 2022/0219022 | A1 | 7/2022 | Barker et al. | |
| 2022/0305300 | A1 * | 9/2022 | Mesmer | A62B 9/022 |

OTHER PUBLICATIONS

European Patent Office, European Search Report dated May 22, 2024 in Application No. 23220725.8.

* cited by examiner

SHUT OFF POSITION
VALVE STROKE = 0

OPEN POSITION

OPEN POSITION
VALVE STROKE = X'

SMART PRESSURE REGULATOR FOR AIRCRAFT OXYGEN SYSTEM

CROSS-REFERENCE TO RELATED APPLICATIONS

This application claims priority to, and the benefit of, India Patent Application No. 202341010901 (DAS CODE: 7B1C), filed Feb. 17, 2023, and titled "SMART PRESSURE REGULATOR FOR AIRCRAFT OXYGEN SYSTEM," which is incorporated by reference herein in its entirety for all purposes.

FIELD

The present disclosure generally relates pressure regulators, and more specifically to an auto adjustable regulator to provide varying amounts of oxygen flow to match increasing need as altitude increases.

BACKGROUND

Aircraft survival systems, such as passenger emergency evacuation systems and the life support oxygen systems, use stored pressurized gas in pressurized cylinders. Oxygen filled portable cylinders are typically configured with a pressure regulator that divides the regulator outlet flow for distribution to multiple masks. Oxygen cylinders are installed to feed a distribution system via regulator and tubing. The passenger compartment will have multiple breathing stations plumbed so each passenger can individually plug in a hose and mask if oxygen gas is needed for survival. Oxygen gas is stored and transported in high pressure cylinders. Oxygen system design depends largely on the operational requirements. Oxygen systems may be continuous-flow or a demand flow system.

In continuous flow systems, oxygen flow from the pressure reducing regulator is continuously fed into hoses attached to masks worn by the user. Even when the user is exhaling, preset flow of oxygen is continuous.

SUMMARY

A pressure regulator system is disclosed herein. The system, includes a valve module; a controller; and a plurality of sensors; wherein the controller is operably coupled to the valve module to adjust outflow of gas from an outlet of the valve module to a plurality of masks in an interior of an aircraft; wherein the plurality of sensors comprises at least one of a pressure sensor and a temperature sensor; wherein the controller is configured to receive feedback of sensed data at the outlet of the valve module about at least outlet pressure and ambient temperature from at least the pressure sensor and the temperature sensor and adjust the outflow of gas from the outlet of the valve module by determining an open-valve time based on the feedback of sensed data received from each sensor; wherein the controllers is configured to control an amount of a flow rate and duration of time of a flow rate of gas from the valve module by transitioning from a closed position to an open position based an operation profile of the valve module associated with a correction of at least an output pressure at the outlet to a desired output pressure.

In various embodiments, the controller is configured to adjust the flow rate at the outlet in accordance with the feedback of sensed data from each sensor for gas flow to the plurality of masks.

In various embodiments, the valve module further comprises: a valve poppet coupled to an electric motor that moves in either in an opening direction to cause a flow area around a conical poppet profile region to increase or moves in a closing direction to cause the flow areas around the conical poppet profile region to decrease.

In various embodiments, in response to a pre-set profile configured for regulation of gas pressure, the controller is configured to maintain a steady uniform pressure value by increasing flow in response increases in altitude by the aircraft.

In various embodiments, the valve module comprises an O-ring seal configured on a shaft of the electric motor to achieve a pressure balance by reducing the valve actuation force.

In various embodiments, the valve poppet is spring loaded and configured with the O-ring seal.

In various embodiments, in the closed position, the conical poppet profile region of the valve poppet is configured to interface with a valve seat of a control orifice body of the regulator module to cause a closure of a channel to the flow area wherein a valve poppet incurs fluidic forces in both a closing direction and the opening direction at the closed position.

In various embodiments, the closed position comprises a shut-off sufficient to cause fluid leakage tightness by providing an adequate sealing stress caused by a net closing force resultant of fluidic forces in both directions.

In various embodiments, the controller is configured to cause a change in the flow area by movement of the poppet defined by a poppet control profile.

In various embodiments, the controller is configured to enable the pressure at the outlet at a pre-set value wherein in response to the energizing of the regulator module to cause to open an orifice for fluid flow, and if the outlet pressure measured is higher than the pre-set value, the controller is configured to generate a control command to reduce the flow area by moving the valve poppet in the closing direction; wherein if the outlet pressure measured is lower than the pre-set value the controller is configured to generate a control command to increase the flow area by moving the valve poppet in the opening direction.

In various embodiments, the movement of the valve poppet is based on several DC voltage pulses per unit time fed to the electric motor that determines a motor operating speed of the motor and subsequent speed of movement of the poppet.

In various embodiments, a pressure control regulator is disclosed. The pressure control regulator includes a valve module comprising: a controller communicatively coupled to a plurality of sensors and an electric motor that adjusts outflow of gas from an outlet of the valve module to a plurality of masks wherein the plurality of sensors comprises at least one of a pressure sensor and a temperature sensor; and a valve poppet connected to the electric motor configured to control an amount of a flow rate and duration of time of a flow rate of gas from the valve module by transitioning from a closed position to an open position based an operation profile of the valve module associated with a correction of at least an output pressure at the outlet to a desired output pressure; wherein the controller is configured to receive feedback of sensed data at the outlet of the valve module about at least outlet pressure and ambient temperature from at least the pressure sensor and the temperature sensor and adjust the outflow of gas from the outlet of the valve module by determining an open-valve time based on the feedback of sensed data received from each sensor.

In various embodiments, the controller is configured to adjust the flow rate at the outlet in accordance with feedback of the sensed data from each sensor for gas flow to the plurality of masks.

In various embodiments, the valve poppet is coupled to an electric motor and moves in either an opening direction to cause a flow area around a conical poppet profile region to increase or moves in a closing direction to cause the flow areas around the conical poppet profile region to decrease.

In various embodiments, in response to a pre-set profile configured for regulation of gas pressure, the controller is configured to maintain a steady uniform pressure value by increasing flow in response increases in altitude.

In various embodiments, the valve module comprises an O-ring seal on a shaft of the electric motor to achieve a pressure balance by reducing the valve actuation force.

In various embodiments, the valve poppet is spring loaded configured with the O-ring seal.

In various embodiments, in the closed position, the conical poppet profile region of the valve poppet is configured to interface with a valve seat of a control orifice body of the regulator module to cause a closure of a channel to the flow area wherein a poppet valve incurs fluidic forces in both the closing direction and the opening direction at the closed position.

In various embodiments, the closed position comprises a shut-off sufficient to cause fluid leakage tightness by providing an adequate sealing stress caused by a net closing force resultant of fluidic forces in both directions wherein the controller is configured to cause a change in the flow area by movement of the poppet defined by a poppet control profile.

In various embodiments, the controller is configured to enable the pressure at the outlet at a pre-set value wherein in response to the energizing of the regulator to cause to open a control orifice, and if the outlet pressure measured is higher than the pre-set value, the controller is configured to generate a control command to reduce the flow area by moving the valve poppet in a closing direction; wherein if the outlet pressure measured is lower than the pre-set value the controller is configured to generate a control command to increase the flow area by moving the valve poppet in the opening direction.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to “a,” “an” or “the” may include one or more than one and that reference to an item in the singular may also include the item in the plural. Further, all ranges may include upper and lower values and all ranges and ratio limits disclosed herein may be combined.

Figure 1:
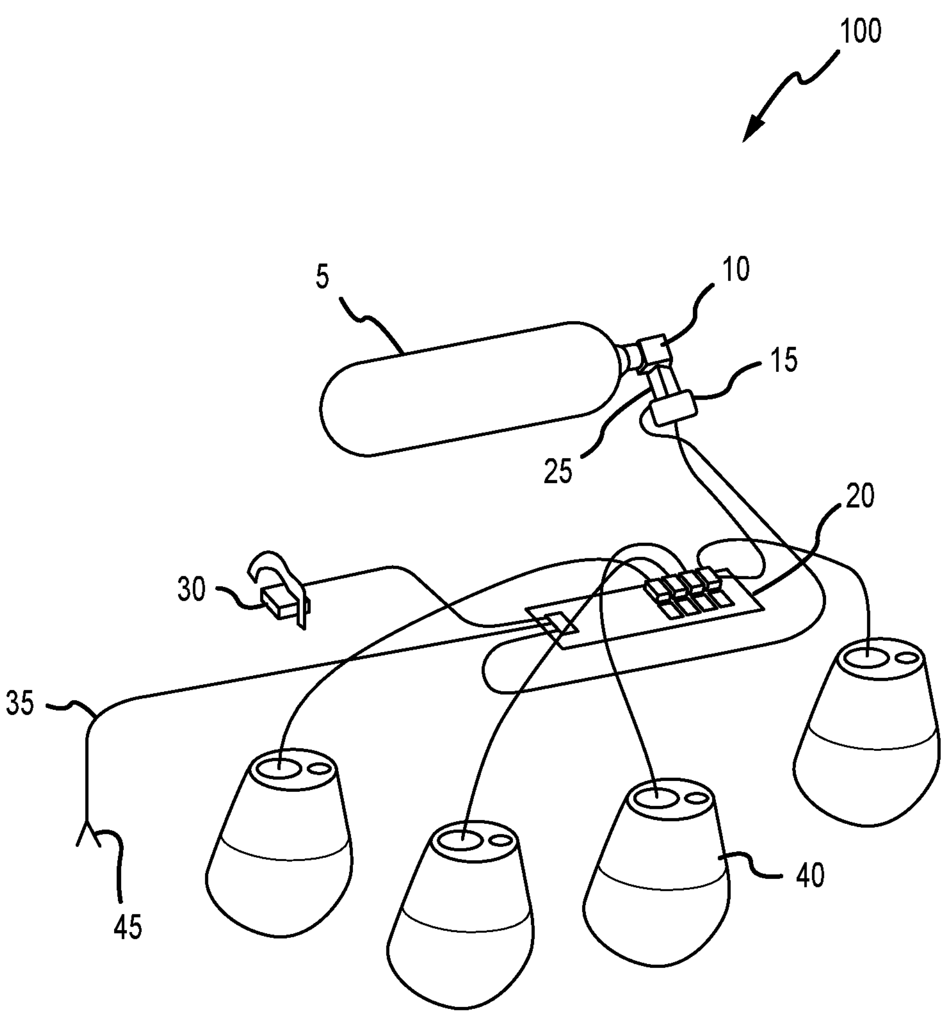
FIG. 1 illustrates a diagram of a pressurized gas bottle coupled with multiple user masks and actuator system, in accordance with various embodiments.

Referring now to FIG. 1, in accordance with various embodiments, a demand flow system 100 is illustrated. The system 100 includes a gas bottle 5 of a high-pressure module assembly having a high-pressure manifold 10, a regulator 15, a pyrotechnic initiator 25, a latch 30, a power converter 35, controller 20, aircraft electrical power connection 45, and a set of passenger masks 40.

In the demand flow system 100, oxygen is delivered only when the user inhales or on demand. During the hold and exhalation periods of breathing, the oxygen supply is stopped. In this way, the duration of the oxygen supply is prolonged as little to none is wasted.

Figure 2:
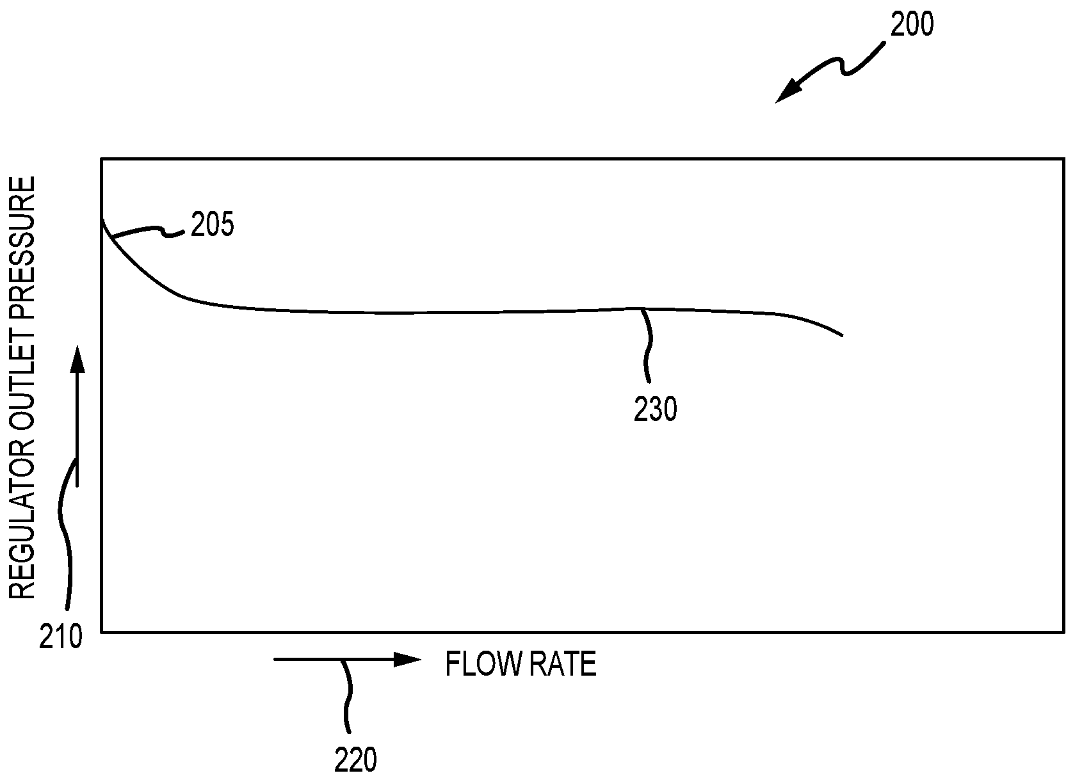
FIG. 2 illustrates a graph of regulator flow characteristics of oxygen pressure regulator with a pressurized gas bottle in accordance with various embodiments.

FIG. 2 illustrates a graph 200 of regulator performance in accordance with various embodiments. The locked-up pressure 205 in allows for a no flow condition, while the flow outlet pressure is reduced with increases in flow rate. Also, the flow pressure values 230 are lowered with increases in flow rate in the graph of FIG. 2. The flow pressure values are shown to vary with changes in temperature. The flow pressure is more uniform (i.e., the regulator outlet pressure 210) at the inlet pressure and varies slightly with flow demand (flow rate 220) and operating temperature. In implementation, several dynamic O-ring seals are used, which can benefit from periodic maintenance for replacement. The preset outlet pressure for the nominal flow conditions is determined by the spring load setting. Once the regulator is configured with preset nominal requirements and assembled to system, it operates in passive mode, responding to the fluid pressure drops in the feed system.

Figure 3:
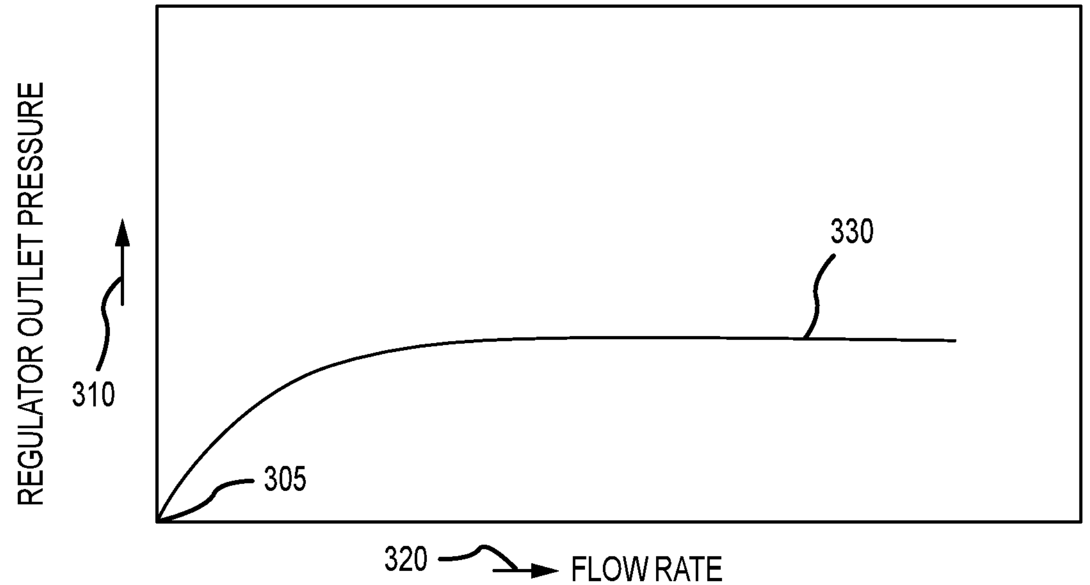
FIG. 3 illustrates a graph of a smart regulator flow characteristics of oxygen pressure regulator with a pressurized gas bottle in accordance with various embodiments.

FIG. 3 illustrates a graph 300 of the smart regulator performance in accordance with various embodiments. The regulator outlet pressure 310 operates from an initial shut-off state 305 with no pressure trapped at the outlet. At the flow rate 320 is increased, the smart regulator is activated to cause a regulated pressure 330 that is gradually increased to a steady state level of to achieve a particular steady-state value. In various embodiments, the oxygen storage cylinder is kept a high pressure, the isolation valve operated by pyrotechnic initiator 25 (of FIG. 1) to cause the flow in an emergency situation, the pressure valve is activated to regulate the output pressure at a steady state level. The smart regulator is controlled by a controller that implements an algorithm to achieve the steady state value and the regulated pressure.

Figure 4:
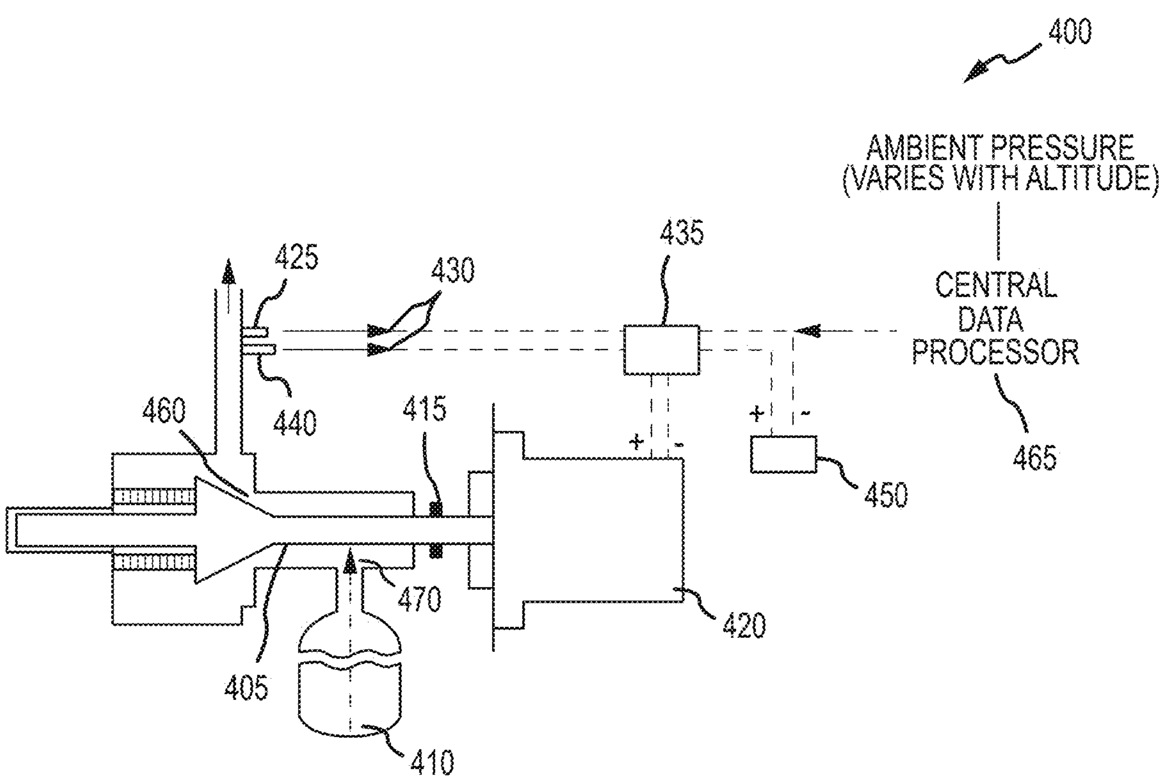
FIG. 4 illustrates a diagram of the smart pressure reducing oxygen pressure regulator for use with a pressurized gas bottle, in accordance with various embodiments.

FIG. 4 illustrates a diagram of the smart pressure reducing oxygen pressure regulator 400 ("regulator") for use with a pressurized gas bottle 410, in accordance with various embodiments. FIG. 4 shows a smart pressure reducing oxygen regulator system ("regulator") 400 that includes a regulating valve poppet 405 to direct the control of flow in the flow area 460 from a pressurized gas bottle 410 and is connected via an O-ring seal 415 to a linear stepper motor 420 (i.e., solenoid device). The linear stepper motor 420 is controlled by a pressure controller 435 that receives sensor feedback 430 from a variety of sensors that include data from a temperature sensor 425, and pressure sensor 440. The pressure controller 435 and linear stepper motor 420 use a local power source of the battery 450. The pressure controller 435 can be connected to a central data processor 465 that monitors ambient pressure changes with altitude changes and sends data to the pressure controller 435 for control of the linear stepper motor 420 and the flow out 470 of the gas mixture from the cycling of the regulating valve poppet 405.

In various embodiments, the regulating valve poppet 405 is controlled by the pressure controller 435 to prevent the output of gas flow (i.e., oxygen flow out 470 of the pressurized gas bottle 410) in a locked-up pressure state. The locked-up pressure state causes the regulating valve poppet 405 to be moved by control of the linear stepper motor 420 in a closing direction for a no flow condition. As the downstream flow outlet pressure is increased with increases in flow rate, the movement of the regulating valve poppet 405 in an opening direction. The flow pressure values are lowered with increases in flow rate in the opening direction. Also, the flow pressure values are shown to vary with changes in temperature. The flow pressure is more uniform at the inlet (valve poppet 405) pressure and varies slightly with flow demand and operating temperature.

In various embodiments, the linear stepper motor 420 comprises an off the shelf linear stepper motor 420. The rotational movement of the shaft of the motor is translated into linear movement of the valve poppet (Dx/dt). The position of the valve poppet 405 is motioned in a forward and backward direction (i.e., an opening or closing direction) that expands, contracts or seals the channel (i.e., adjusting the spacing for the fluid area) for the fluid flow by the controller 20 by control of the number of direct current (DC) voltage pulses applied to rotationally operate the shaft of the linear stepper motor 420. The speed of the linear movement can be controlled by varying the frequency of the DC voltage pulses fed by the controller 435 to the motor.

Using the linear stepper motor 420 allows for position control of the valve poppet 405 without the benefit of feedback and/or other related sophisticated servo control schema. The linear stepper motor 420 is a simplified motor unit as the rotary translation components to linear conversion unit reside within the motor unit. The actuation load requirement can be minimized by utilizing the pressure balancing features that are realized by O-ring (O-ring seal 415) dynamic seals provided. In various embodiments, a servo-controlled DC torque motor can be implemented instead of the linear stepper motor 420 to operate this regulator 400. In various embodiments because the regulator 400 implements electric driven devices with pressure controller 435, heating elements if desired can be incorporated in the configuration to enable the heating of the regulator in an automatic mode to avoid formation of ice.

The oxygen flow system uses a regulator 400 that is auto adjustable to provide varying amounts of oxygen flow that match or correspond to increases in demand of the oxygen flow as the altitude of the aircraft increases. In various embodiments, additional performance feature can be realized by using pressure demand regulator 400 that include compensating for variations with temperature, and the minimizing of the temperature variations. In implementation, by increasing the quantity of oxygen or mass flow of oxygen which causes higher oxygen concentration to the mask. This results in higher levels of oxygen that can be inhaled by a user so the user can receive sufficient oxygenation with a reduced pressure of flow to the mask. The increased level of oxygen can allow for an offset to the pressure encountered in flight as altitude increases.

As shown in FIG. 4, the control valve is operated by a linear stepper motor 420 with linear movement as the output. This has integral unit to transfer motor rotary movement to liner type. The valving element or the valve poppet 405 can be directly attached to the motor spool or shaft. The valve poppet 405 is configured as an integral part with a shaped control profile to achieve a desired regulated pressure performance.

In various embodiments, the pressure regulator functioning involves a closed loop pressure control system to achieve the preset pressure values. The electrically operated pressure control valve, pressure and temperature feedback sensors and a pressure controller 435 preset with required outlet pressure to time values. Additionally, if the flow demand is raised to compensate for an altitude increase, the regulator 400 opening is therefore increased considering the ambient pressure data fed to the pressure controller 435. Also, the regulator 400 performance variation with temperature can be minimized or brought down within close tolerance range.

In various embodiments, the pressure regulator 400 configuration uses a closed loop pressure control with DC linear stepper motor 420 operated flow control valve (FCV). This electrically operated valve is designed with flow shut off and pressure regulating valve features. Hence, a separate flow shut off valve of a regulator unit is not present. This regulator 400 can be operated repeatedly in component and system level and without requiring resetting of operating the regulator 400 unit.

In various embodiments, to increase the regulator 400 flow area 460 actively, the flow outage can be increased as needed. For example, output of a specified gas bottle 410 pressure by the active flow control can achieve or maintain steady (or nearly steady) and uniform regulator 400 pressure values as required. Additionally, flow increasing feature with altitude increase with reducing flow pressure feature shall be provided. The operational features are implemented by respective control algorithms.

The regulator 400 performance variation with ambient temperatures is eliminated by the using multiple regulated pressure profiles for different output requirements. In various embodiments, the different output are achieved by varying the conical poppet profile for movement in the opening and closing directions of the valve poppet 405 that control the flow in the flow area 460.

The current regulator 400 implements a force balancing from the fluid pressure acting at different O-ring seals and the spring forces configured with the shaft coupling to the linear stepper motor 420.

Figure 5:
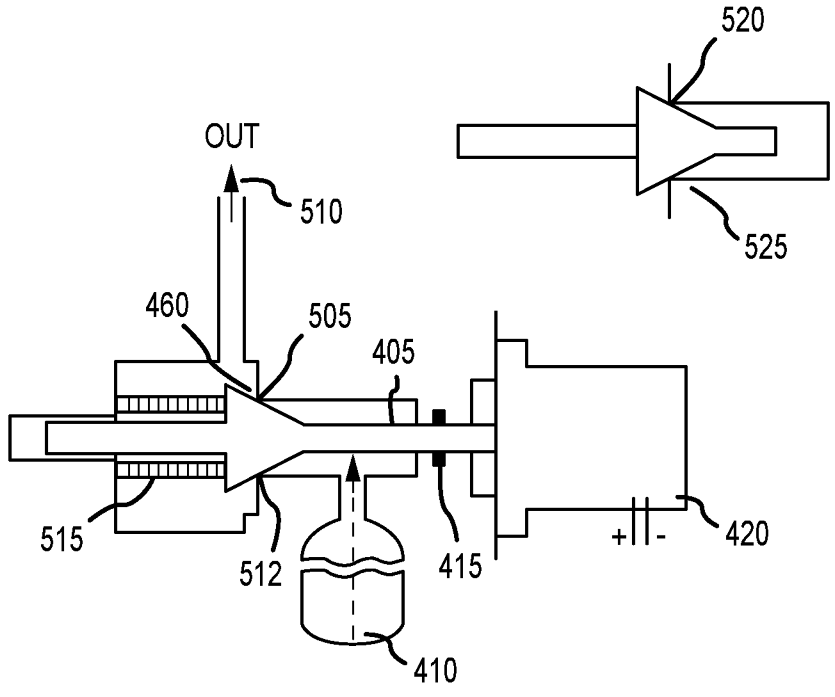
FIG. 5 illustrates a diagram of an electric motor operated pressure control valve of the smart pressure reducing oxygen pressure regulator for use with a pressurized gas bottle, in accordance with various embodiments.

FIG. 5 illustrates a diagram of a pressure control valve in a closed position under various embodiments. In FIG. 5, the pressure control valve is configured in a closed and the regulating valve poppet 405 is spring loaded and provided with dynamic O-ring seal to avoid the fluid medium contacting the linear stepper motor 420. The O-ring seal enables a pressure balance configuration to reduce the valve actuation force. In the closed position, the valve poppet 405 which has a conical shape is configured to interface with valve seat 512 of the control orifice body 505 to cause closure of the flow area 460. In this closed or shut off position, the valve poppet 405 incurs or experiences multiple forces caused by fluid pressure in both closing and opening directions.

Figure 6A:
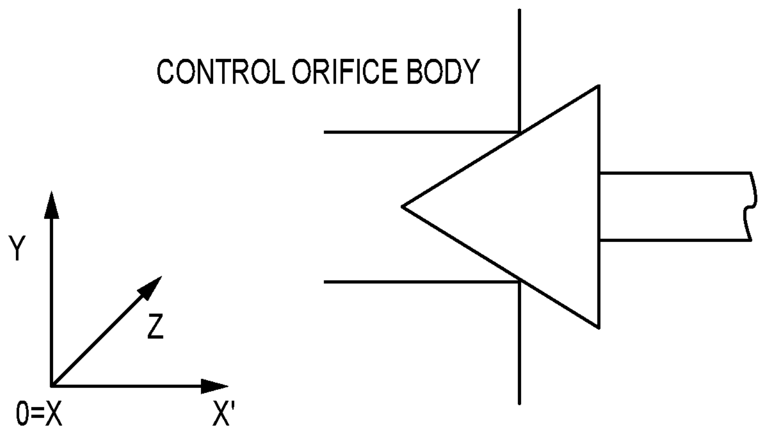
FIGS. 6A, 6B, and 6C illustrate diagrams of a valve stroke and flow area from an initial shut-off position to an open position of the smart pressure reducing oxygen regulator for use with a pressurized gas bottle, in accordance with various embodiments.
Figure 6B:
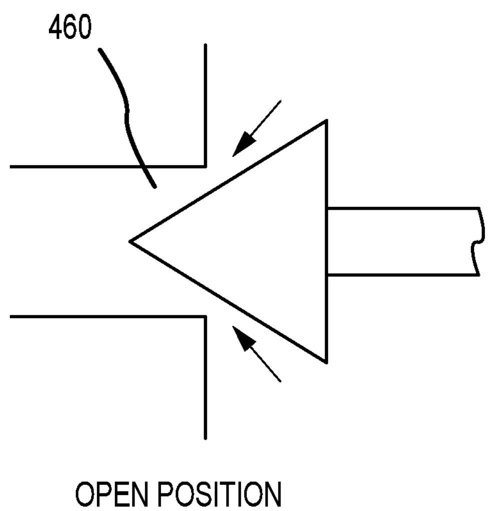
Figure 6C:
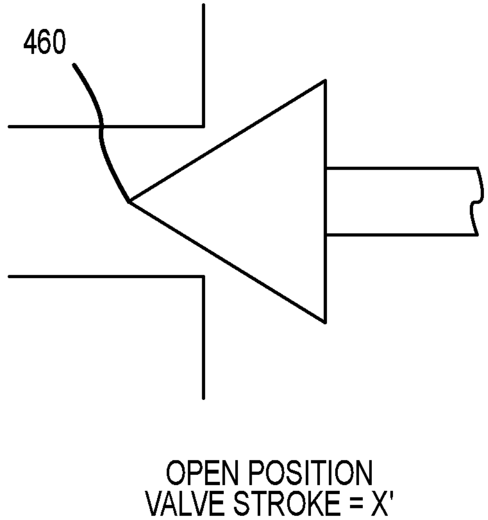

A certain amount of closing force is maintained to position the valve poppet 405 in the valve seat 512 to ensure sufficient leak tightness by use of a selected spring force via spring 515, and an appropriate O-ring seal size for the valve poppet 405 sealing area. The shut-off position of the valve poppet 405 for fluid leak tightness can be achieved by providing adequate sealing stress by a net closing force, the seating land area and the surface finishes of the seal and valve seat 512 interfacing faces are urged against each other. The shut off leak tightness can be achieved using seat land bushing 520 composed of plastic type material. This way, separate flow shut off or isolation valve as in the existing regulator module design is not required. From the initial shut-off position, in response to the linear stepper motor 420 being energized with DC voltage pulses by the controller 435, the linear stepper motor 420 develops sufficient electro-mechanical force to actuate the valve poppet 405 in the opening direction Referring to FIGS. 6A, 6B, and 6C, FIG. 6A illustrates a diagram of the valve stroke and flow area in accordance with various embodiments. In FIG. 6A, as the valve poppet 405 moves in the opening direction (X=0 to X=X'), the valve stroke and the flow area 460 around the conical poppet profile region increases. The flow area 460 replicates a conical frustum in FIG. 6B. The flow area 460 increases with the valve poppet 405 movement in opening direction (in FIG. 6C) and decreases with valve poppet 405 movement in the closing directions (X=X' to X=0). By changing the electric polarity, electric motor can drive the valve poppet 405 in the closing direction. For a valve body orifice 505 diameter, the flow area 460 change with poppet movement (day/dx) which is guided by the shape of valve poppet 405 control profile. The number of DC voltage pulses per unit time fed to the linear stepper motor 420 will determine the stepper motor operating speed which controls the speed of valve poppet 405 movement (dx/dt). Hence the resultant flow area 460 changes with time that is affected by the profile design and the operating speed. In various embodiments, other types of curves are possible other than a typical linear curve.

As illustrated in FIGS. 6A-6C with FIG. 4, the valve outlet pressure is monitored by a pressure sensor 440 with feedback to the controller 435. The controller 435 can be pre-set with a desired or required outlet pressure value. Once the regulator 400 is energized to open, and if the outlet pressure measured is higher than the preset value, the controller 435 generates control command to linear stepper motor 420 for actuating the valve poppet 405 to reduce the flow area 460 by moving the valve poppet 405 in closing direction. In various embodiments, if the pressure measured by the pressure sensor 440 is less than pre-set value, then the pressure at the flow out 470 is corrected by increasing the flow area 460. The controller 435 stops generating control command once the feed value matches with a preset value. A suitable algorithm is configured to enable the processing of the pressure control or regulation taking in account the required operational features desired. The controller 435 can be embedded with processing software's to achieve the desired pressures at the regulator outlet or flow out 470.

Figure 7:
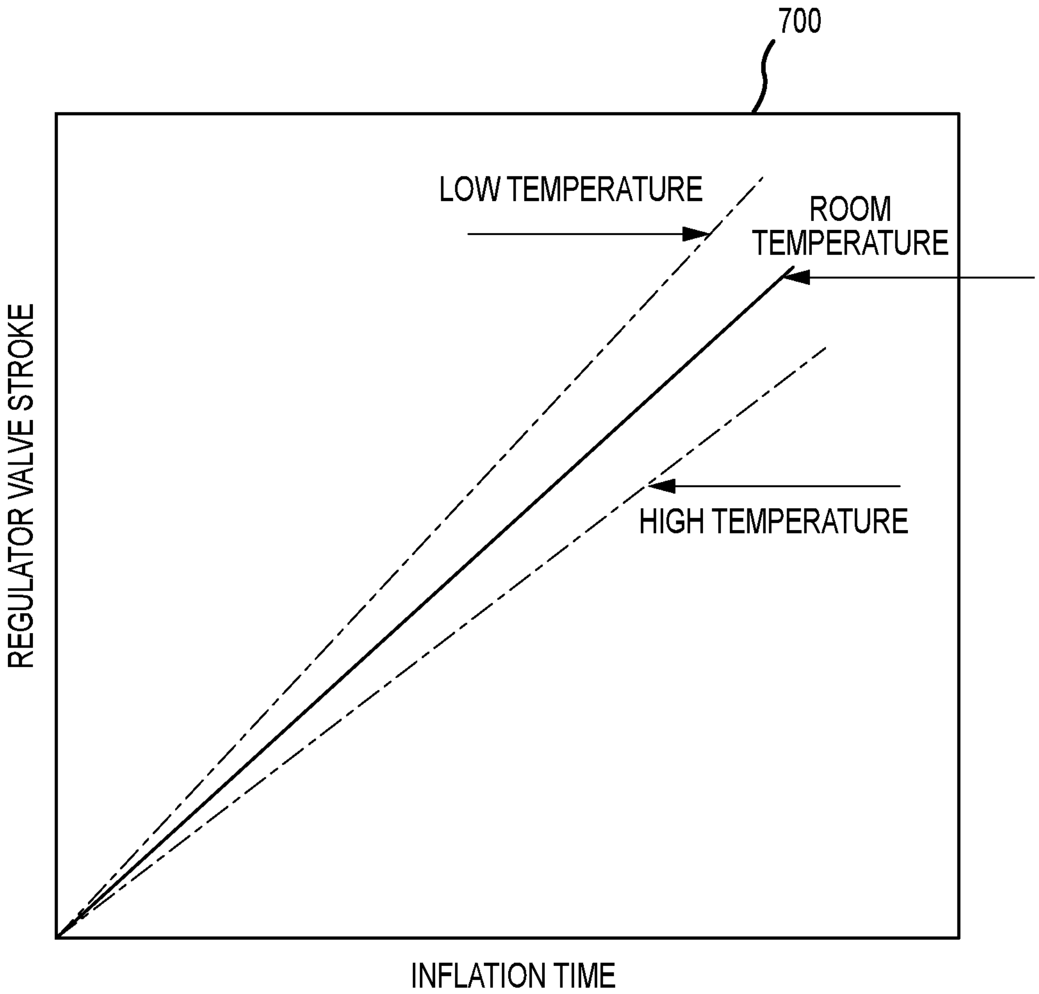
FIG. 7 illustrates a graph of a regulator valve operating speed in relation to temperature of the smart pressure reducing oxygen pressure regulator for use with a pressurized gas bottle, in accordance with various embodiments.

Referring to FIG. 7, FIG. 7 illustrates a graph of the regulator valve stroke to the inflation time in accordance with various embodiments. In FIG. 7, in graph 700, at lower temperatures, the control action that are needed or required are directed to increasing the valve stroke or the opening area within the same time profile. Likewise, or similarly at higher temperature, the control action that is required is to reduce the valve stroke or decrease the opening area within the same profile. Within the same time interval, these stroke vs time profile can be achieved by varying the operating speed of motor. For stepper motor 420, this is achieved by varying the feed rate of the inputted DC voltage pulses per second (pops). The higher pulses per second applied to the stepper motor causes increases in the speed, and vice versa lower PPS causes decreases in speed.

In various embodiments, to implement a corrective control action, the temperature sensor is configured at the valve outlet body with a feedback loop to the controller as illustrated in FIG. 4. The controller can be preset with required stroke vs time profile with temperatures. Based on the feedback temperature, the corresponding stroke vs time profile is selected for operation and pressure correction is taken care. A stroke vs time with temperature database can be created based on empirical testing before installation and implementation of the pressure control valve.

In various embodiments, when the pressure regulator system operates at high altitude with increasing flow demand, additional control logic is added. Referring to FIG. 4, the ambient pressure with altitude is measured and this data shall be fed to the pressure controller. In various embodiments, the amount that the regulator is opened is determined by the pressure controller 435 and the additional logic (i.e., the central data processor 465) to meet the flow demand at the expense of a reduction in outlet pressure. In various embodiments, the flow characterization is performed by empirical testing via a ground test and the results are fed to the pressure controller 435. The data from the testing can be used to program an algorithm or suitable control logic to operate the regulator.

In various embodiments, the pressure regulator configuration implements closed loop pressure controls with the DC linear stepper motor 420 operated flow control valve (FCV). The electrically operated valve (i.e., valve poppet 405) is configured with a flow shut-off and pressure regulating valve features. The is no need for a separate flow shut off valve with this regulator system configuration. Since it is possible to increase the regulator flow area actively, the flow outage can be increased whenever required. For a specified gas bottle pressure, almost steady uniform regulator pressure values can be maintained if required. Additionally, flow increasing feature with altitude increase with reducing flow pressure feature shall be provided and can be implemented by respective control algorithms.

In various embodiments, the regulator performance variations caused by ambient temperatures are reduced or eliminated by the feedback sensed data and adjustments of the pressure controller 435. Also, a plurality of regulated pressure profile requirements can be easily configured by varying or changing the shape of the conical valve poppet profile region.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for delivering gas to a plurality of masks in an interior of an aircraft, comprising:

a valve module;

a controller; and a plurality of sensors including a pressure sensor and a temperature sensor;

wherein the controller is operably coupled to the valve module to adjust outflow of gas from an outlet of the valve module to the plurality of masks;

wherein the controller is configured to:

receive feedback of sensed data at the outlet of the valve module about an outlet pressure and an ambient temperature from the pressure sensor and the temperature sensor, select a preset stroke vs time profile based on the ambient temperature, adjust the outflow of gas from the outlet of the valve module by determining an open-valve time based on the feedback of sensed data received from each sensor; and adjust a flow rate and a duration of time of the outflow of gas by commanding the valve module to transition from a closed position to an open position based on the preset stroke vs time profile to achieve a desired output pressure.

2. The system of claim 1, wherein the controller is configured to adjust the flow rate at the outlet in accordance with the feedback of sensed data from each sensor in the plurality of sensors for gas flow to the plurality of masks.

3. The system of claim 2, further comprising: wherein the valve module further comprises a valve poppet coupled to an electric motor, the valve poppet configured to move either in an opening direction to cause a flow area around a conical poppet profile region to increase or in a closing direction to cause the flow area around the conical poppet profile region to decrease based on the preset stroke vs time profile.

4. The system of claim 3, wherein the controller is configured to maintain a steady uniform pressure value by increasing a valve stroke in response to increases in altitude by the aircraft.

5. The system of claim 4, wherein the valve module comprises an O-ring seal disposed on a shaft of the electric motor at a position between a flow out area and the electric motor.

6. The system of claim 5, wherein the valve poppet is disposed between a spring and the O-ring seal.

7. The system of claim 6, wherein, in the closed position, the conical poppet profile region of the valve poppet is configured to interface with a valve seat of a control orifice body of the valve module to cause a closure of a channel to the flow area, and wherein the valve poppet is configured to experience a first force imparted by a fluid on a first side of the valve poppet and a second force opposing the first force, such that the first force and the second force cause movement of the valve poppet in the closing direction and in the opening direction.

8. The system of claim 7, wherein the closed position comprises a shut-off sufficient to cause fluid leakage tightness by providing an adequate sealing stress caused by a net closing force resulting from the first force and the second force.

9. The system of claim 8, wherein the controller is configured to cause a change in the flow area around the conical poppet profile region by movement of the valve poppet.

10. The system of claim 9, wherein the controller is configured to maintain the pressure at the outlet at a pre-set value, wherein the controller is configured to command the valve poppet to move in the closing direction in response to an outlet pressure being measured higher than the pre-set value, and wherein the controller is configured to command the valve poppet to move in the opening direction in response to the outlet pressure being measured lower than the pre-set value.

11. The system of claim 10, wherein movement of the valve poppet is based on a number of direct current voltage pulses per unit time fed to the electric motor that determines a motor operating speed of the electric motor and subsequent speed of movement of the valve poppet.

12. A pressure control regulator for delivering gas to a plurality of masks, the pressure control regulator comprising:

a valve module comprising:

a controller communicatively coupled to a plurality of sensors and an electric motor configured to adjust an outflow of gas from an outlet of the valve module to the plurality of masks, wherein the plurality of sensors comprises a pressure sensor and a temperature sensor; and a valve poppet connected to the electric motor, the electric motor configured to control a flow rate and a duration of time of the outflow of gas from the valve module by transitioning the valve poppet from a closed position to an open position based on a preset stroke vs time profile of the valve module to achieve a desired output pressure, wherein the controller is configured to:

receive feedback of sensed data at the outlet of the valve module about at least an outlet pressure and an ambient temperature from the pressure sensor and the temperature sensor, and adjust the outflow of gas from the outlet of the valve module by determining an open-valve time based on the feedback of sensed data received from each sensor and based on the preset stroke vs time profile.

13. The pressure control regulator of claim 12, wherein the controller is configured to adjust the flow rate at the outlet in accordance with feedback of the sensed data from the pressure sensor and the temperature sensor for the outflow of gas flow to the plurality of masks.

14. The pressure control regulator of claim 13, wherein the valve poppet is coupled to the electric motor and is configured to move in either an opening direction to cause a flow area around a conical poppet profile region to increase or to move in a closing direction to cause the flow area around the conical poppet profile region to decrease.

15. The pressure control regulator of claim 14, wherein the controller is configured to maintain a steady uniform pressure value by increasing the outflow of gas in response to increases in altitude.

16. The pressure control regulator of claim 15, wherein the valve module comprises an O-ring seal disposed on a shaft of the electric motor at a position between a flow out area and the electric motor.

17. The pressure control regulator of claim 16, wherein the valve poppet is disposed between a spring and the O-ring seal.

18. The pressure control regulator of claim 17, wherein, in the closed position, the conical poppet profile region of the valve poppet is configured to interface with a valve seat of a control orifice body of the valve module to cause a closure of a channel to the flow area, and wherein the valve poppet is configured to experience forces in both the closing direction and the opening direction when in the closed position.

19. The pressure control regulator of claim 18, wherein the closed position comprises a shut-off sufficient to cause fluid leakage tightness by providing an adequate sealing stress caused by a net closing force resulting from the forces in both the closing direction and the opening direction, and wherein the controller is configured to cause a change in the flow area around the conical poppet profile region by movement of the valve poppet.

20. The pressure control regulator of claim 19, wherein the controller is configured to:

maintain the pressure at the outlet at a pre-set value, in response to an outlet pressure being higher than the pre-set value, command the valve poppet to move in the closing direction, and in response to the outlet pressure being lower than the pre-set value, command the valve poppet to move in the opening direction.

* * * * *